United States Patent
Jung et al.

(10) Patent No.: US 12,441,137 B2
(45) Date of Patent: Oct. 14, 2025

(54) TIRE FOR VEHICLE

(71) Applicants: Hyundai Motor Company, Seoul (KR); Kia Motors Corporation, Seoul (KR)

(72) Inventors: Jae Sung Jung, Gyeonggi-do (KR); Se Hwan Ku, Seoul (KR); Hyun Woo Hong, Gyeonggi-do (KR); Dae Hwan Jo, Seoul (KR); Ju Ho Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 636 days.

(21) Appl. No.: 17/003,804

(22) Filed: Aug. 26, 2020

(65) Prior Publication Data

US 2021/0101410 A1 Apr. 8, 2021

(30) Foreign Application Priority Data

Oct. 2, 2019 (KR) .......................... 10-2019-0121956

(51) Int. Cl.
*B60C 7/12* (2006.01)
*B60C 5/20* (2006.01)
*B60C 7/10* (2006.01)

(52) U.S. Cl.
CPC ............... *B60C 5/20* (2013.01); *B60C 7/101* (2021.08); *B60C 7/121* (2021.08); *Y10T 152/10036* (2015.01); *Y10T 152/10432* (2015.01); *Y10T 152/1054* (2015.01)

(58) Field of Classification Search
CPC ................................ B60C 7/121; B60C 7/107
See application file for complete search history.

(56) References Cited

U.S. PATENT DOCUMENTS

| | | | | |
|---|---|---|---|---|
| 5,520,232 | A * | 5/1996 | Fukutake | ................... B60C 7/12 |
| 8,276,628 | B2 * | 10/2012 | Hanada | ..................... B60C 7/12 |
| | | | | 152/157 |
| 9,139,046 | B2 * | 9/2015 | Norbits | ..................... B60C 7/12 |
| 9,481,208 | B2 * | 11/2016 | Matsuda | ................. B60C 7/125 |
| 2009/0211675 | A1 | 8/2009 | Louden | |
| 2010/0212797 | A1 | 8/2010 | Eaton | |

FOREIGN PATENT DOCUMENTS

| | | | |
|---|---|---|---|
| JP | 2010137648 A | * | 6/2010 |
| KR | 10-2012-0080807 A | | 7/2012 |
| KR | 10-2014-0115690 A | | 10/2014 |
| KR | 1020190105877 A | * | 9/2019 |

OTHER PUBLICATIONS

English machine translation of JP 2010-137648 A, Jun. 24, 2010.*
English machine translation of KR 10-2019-0105877 A, Sep. 18, 2019.*

* cited by examiner

*Primary Examiner* — Adrienne C. Johnstone
(74) *Attorney, Agent, or Firm* — Fox Rothschild LLP

(57) ABSTRACT

A tire for a vehicle has a structure in which a plurality of air blocks are detachably mounted in a circumferential direction of the tire. The tire is similar to an airless tire, in which a plurality of spokes are connected to and arranged between a tread rim part configured to come into contact with a road surface and a hub which is mounted to the wheel, and the tire is also similar to a pneumatic tire, in which an air block is replaceably inserted and mounted into an air block mounting space formed between the spokes.

4 Claims, 6 Drawing Sheets

TIRE FOR VEHICLE

CROSS-REFERENCE TO RELATED APPLICATION

This application claims under 35 U.S.C. § 119(a) the benefit of Korean Patent Application No. 10-2019-0121956 filed on Oct. 2, 2019, the entire contents of which are incorporated herein by reference.

BACKGROUND

(a) Technical Field

The present disclosure relates to a tire for a vehicle, more particularly, to the tire in which a plurality of air blocks are detachably mounted in a circumferential direction of the tire.

(b) Description of the Related Art

As is well known, tires of a vehicle support an entire weight of the vehicle, cushion vibration and impact transmitted from a road surface, and transmit driving and braking forces of the vehicle to the road surface, and so the tires are indispensable elements constituting the vehicle.

As the above-mentioned tires, there are different types, including a tube tire in which a separate tube is embedded, a pneumatic tire (for example, a radial tire and a bias tire) for maintaining air-tightness and being mounted on a wheel of the vehicle, and an airless tire that does not require filling of air.

The tube tire is rarely used at present since when an inner tube is damaged, this tube should be replaced with new one or repaired after the tire is detached from the wheel.

Figure 1:
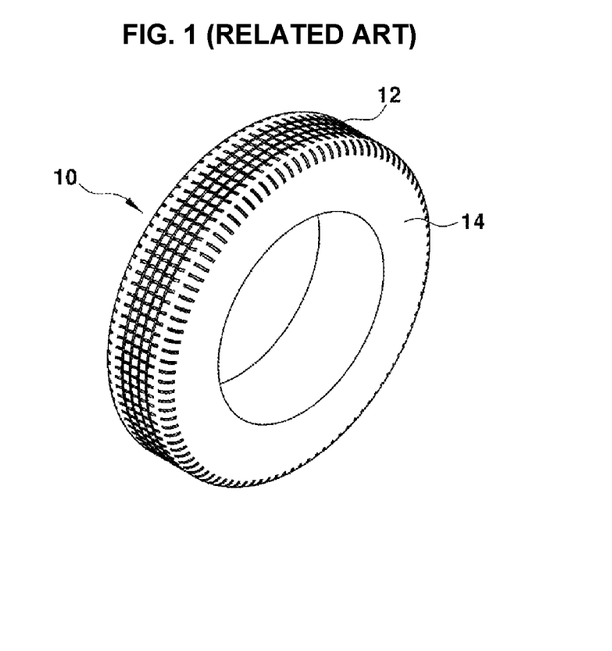
FIG. 1 (RELATED ART) is a schematic view illustrating a conventional pneumatic tire.

Referring to FIG. 1 (RELATED ART), a pneumatic tire 10 is a tire in which a tire itself maintains air tightness, and is usually composed of a tread rim part 12 configured to come into contact with a road surface, a side wall 14 which is pressed against a wheel to enable the air tightness to be kept, and the like. Therefore, this pneumatic tube does not require a separate tube, and has the advantage of excellent running stability, and thus has been applied to almost all vehicles.

However, the pneumatic tire 10 has drawbacks in that it is impossible for the vehicle to be run when the tire is damaged, running performance depends on pneumatic pressure, and the tire should be filled with air when pneumatic pressure is insufficient.

Figure 2:
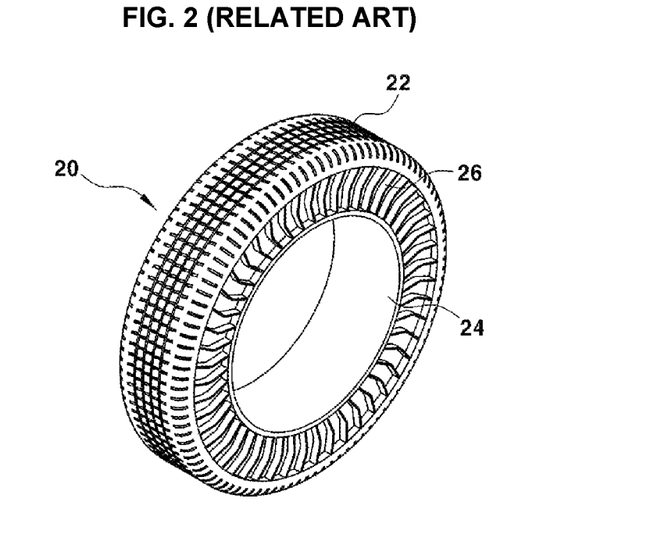
FIG. 2 (RELATED ART) is a schematic view illustrating a conventional airless tire.

Referring to FIG. 2 (RELATED ART), an airless tire 20 is primarily in the concept/future stage, and typically includes a tread rim part 22 configured to come into contact with a road surface, a hub 24 which is located inside the tread rim part 22, a plurality of spokes 26 connected to and arranged at tight intervals between the tread rim part 22 and the hub 24, and the like, and so this tire has an advantage of not requiring air filling.

However, the airless tire 20 has a disadvantage in that riding comfort is inferior and high-speed running stability is inferior because road impact is cushioned by the spokes 26 instead of pneumatic pressure.

Therefore, there is a demand for development of a tire having advantages of the pneumatic tire and the airless tire.

The above information disclosed in this Background section is only for enhancement of understanding of the background of the disclosure and therefore it may contain information that does not form the prior art that is already known in this country to a person of ordinary skill in the art.

SUMMARY

In one aspect, the present disclosure provides a tire for a vehicle having a configuration in which a plurality of spokes are connected to and arranged between a tread rim part to be in contact with a road surface and a hub to be mounted to a wheel, an air block mounting space is formed between the spokes and an air block is detachably inserted and mounted into the air block mounting space, and so the plurality of air blocks are arranged at a predetermined interval in a circumferential direction of the tire.

In order to achieve the above object, the present disclosure provides a tire for a vehicle including a tread rim part configured to come into contact with a road surface; a hub to be mounted to a wheel; a plurality of spokes connected to and arranged between the tread rim part and the hub in a circumferential direction; an air block mounting space formed between the spokes to be arranged in the circumferential direction; and an air block which is detachably inserted and mounted into the air block mounting space.

Preferably, the spoke and the air block mounting space may be alternately arranged in the circumferential direction.

In addition, the air block may be formed of rubber or soft plastic material to have a sealed structure filled with pneumatic pressure. In addition, the air block may be formed to have a size corresponding to an internal volume of the air block mounting space.

Preferably, a locking structure configured to prevent the air block from being detached may be formed on or detachably mounted to the air block mounting space.

As one embodiment of the locking structure, an elastic locking plate may be detachably mounted on an entrance of the air block mounting space to lock the air block inserted into the air block mounting space.

More preferably, at the entrance of the air block mounting space, the tread rim part and the hub have locking grooves formed therein, and both end portions of the locking plate are inserted and coupled into the locking grooves, respectively.

As another embodiment of the locking structure, a locking rim portion for locking the air block inserted into the air block mounting space may be protruded on an inner circumferential surface of the entrance of the air block mounting space.

More preferably, the locking rim portion may have a guide surface formed an outer surface thereof and inclined downward from an outside to an inside of the air block mounting space to insert and guide the air block into the air block mounting space.

Meanwhile, stopper steps for preventing a detachment of the air block may be further formed on a portion of the tread rim part which forms an upper portion of an opposite opening of the air block mounting space, and on a portion of the hub which forms a lower portion of the opening, respectively, and the stopper steps may be integrally formed with the tread rim part and the hub, respectively.

The present disclosure having the above configuration provides the following effects.

Firstly, it is possible to provide a new type of tire in which the airless tire, in which the plurality of spokes are connected to and arranged between the tread rim part configured to come into contact with a road surface and the hub to be mounted to the wheel, and the pneumatic tire, in which the air block is replaceably inserted and mounted into the air block mounting space formed between the spokes, are simultaneously implemented.

Secondly, even though one of the plurality of air blocks arranged in the circumferential direction of the tire is broken, it is possible to provide the advantage of the airless tire that can be run by a supporting force of the spokes.

Thirdly, the plurality of air blocks arranged in the circumferential direction of the tire can cushion a road running impact to provide advantages of the radial tire having excellent ride comfort and high speed running stability.

Fourthly, when one of the plurality of air blocks arranged in the circumferential direction of the tire is damaged, it can be easily replaced with a new air block, thereby improving reliability of the tire.

The above and other features of the present disclosure are discussed infra.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter reference will now be made in detail to various embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

Figure 3:
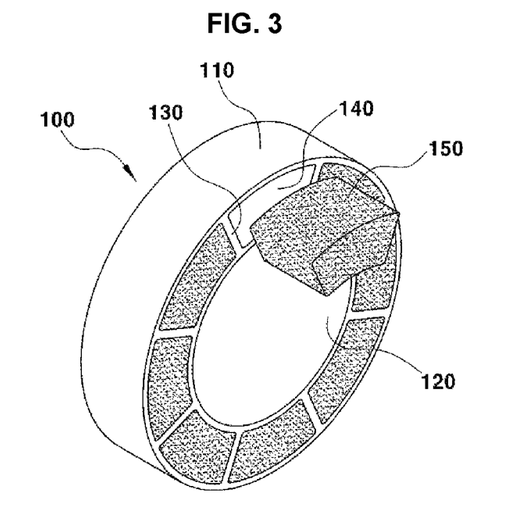
FIG. 3 is an exploded perspective view illustrating one embodiment of a tire for a vehicle, according to the present disclosure.
Figure 4:
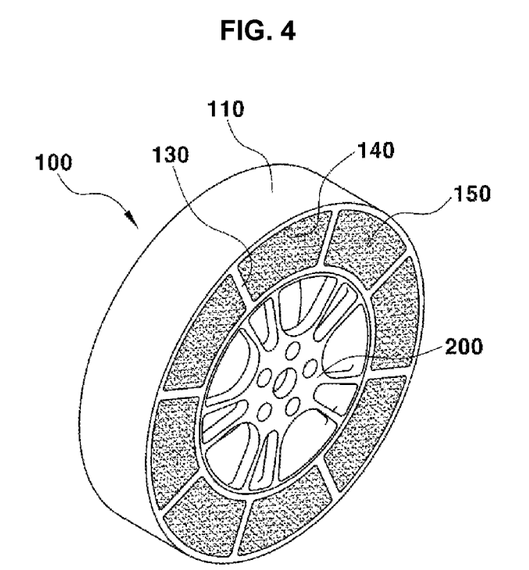
FIG. 4 is an assembled perspective view illustrating one embodiment of the tire for the vehicle, according to the present disclosure.

FIGS. 3 and 4 depict one embodiment of a tire for a vehicle, according to the present disclosure.

As illustrated in FIGS. 3 and 4, a tire 100 for a vehicle, according to the present disclosure, includes a tread rim part 110 configured to come into contact with a road surface when the vehicle is being run, a hub 120 to be mounted to a wheel 200, and a plurality of spokes 130 connected to and arranged between the tread rim part 110 and the hub 120 in a circumferential direction of the tire.

In particular, each space between the spokes 130 is formed as a space 140 for mounting an air block therein, and this air block mounting space 140 is arranged in the circumferential direction of the tire, with each of the spokes 130 being disposed between the air block mounting spaces.

Preferably, the spokes 130 and the air block mounting spaces 140 are formed to be alternately arranged in the circumferential direction of the tire.

More preferably, the spokes 130 and the air block mounting spaces 140 may be alternately arranged in the circumferential direction of the tire, and in addition to the above, the number and shape of the spokes 140 and the air block mounting spaces 140 may be differently determined according to a size and specification of the tire.

Figure 5:
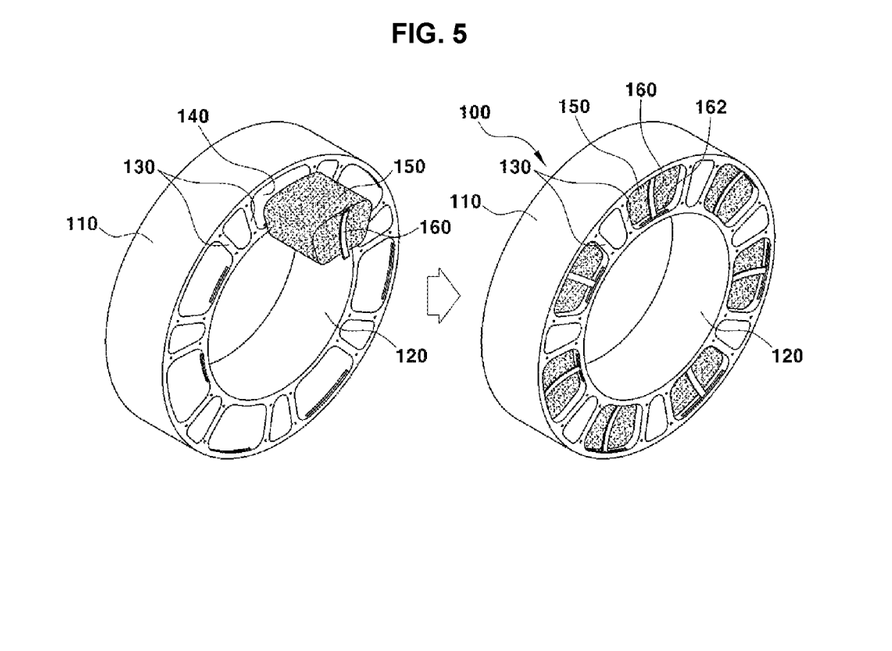
FIG. 5 is an assembled perspective view illustrating another embodiment of the tire for the vehicle, according to the present disclosure.
Figure 9:
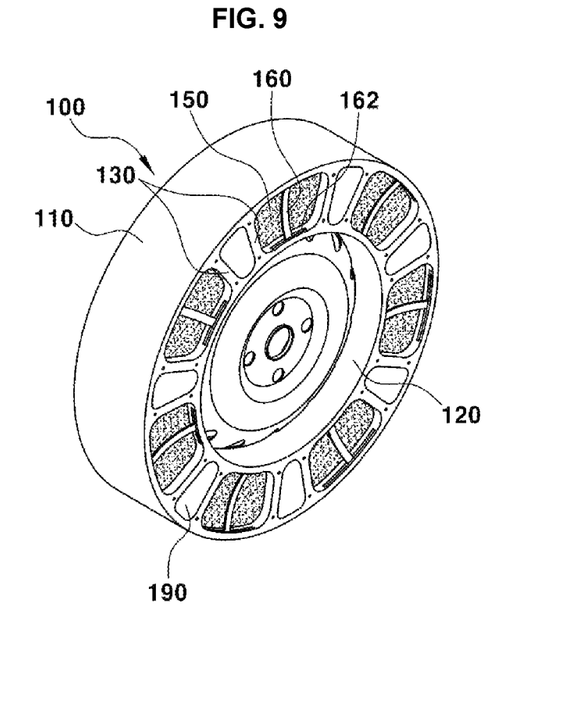
FIG. 9 is a perspective view illustrating a state in which the tire of the present disclosure illustrated in FIG. 5 is coupled to a wheel.

For example, as illustrated in FIGS. 5 and 9, the spokes 130 may be formed asa pair in the circumferential direction of the tire 100, and a separate assembling space 190 for allowing the tire to be coupled with the wheel 200 may be formed between the pair of spokes 130.

Thus, an assembling instrument (for example, a bolt, a nut, a tool, etc.) may enter the tire through the assembling space 190 to easily perform a coupling between the tire 100 and the wheel 200.

Figure 6:
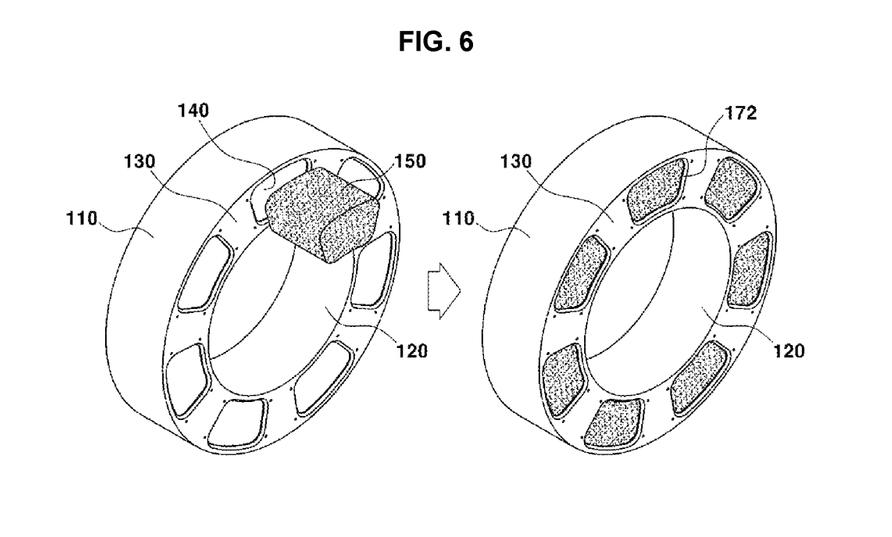
FIG. 6 is an assembled perspective view illustrating still another embodiment of the tire for the vehicle, according to the present disclosure.

Alternatively, as illustrated in FIG. 6, a circumferential directional thickness of the spoke 130 may be increased to allow the spoke to be reinforced, and the air block mounting space 140 may be formed between the spokes.

Here, an air block 150 filled with pneumatic pressure is detachably inserted and mounted into the air block mounting space 140 having a predetermined volume and formed between the spokes 130.

Preferably, the air block 150 is made of rubber or soft plastic material to have a sealed structure filled with pneumatic pressure, and may be manufactured to have a size corresponding to an internal volume of the air block mounting space 140.

When the air block 150 is inserted into the air block mounting space 140, an outer surface of the air block should be in uniform contact with an inner surface of the air block mounting space 140 to support a weight of the vehicle or to cushion an impact, vibration and the like transmitted from a road surface. Therefore, it is more preferable that the air block 150 is manufactured to have a sealed structure having a smooth surface without an air filling valve that may protrude through the outer surface thereof.

Accordingly, the tread rim part 110 which comes into contact with the road surface, the hub 120 to be mounted on the wheel, and the plurality of spokes 130 connected to and disposed between the tread rim part 110 and the hub 120 have a structure which is the same as that of an airless tire, and the air block 150 inserted and mounted into the air block mounting space 140 formed between the spokes 130 forms a structure which is the same as that of a pneumatic tire. As a result, the present disclosure may provide a structure that constitutes a combination of the airless tire and the pneumatic tire.

Due to the above structure, even if one of the plurality of air blocks 150 arranged in the circumferential direction of the tire becomes damaged, the tire according to the present disclosure may provide simultaneously a function of being capable of running the vehicle using a supporting force of the spokes 130 (a function of the airless tire) and a function of supporting a weight of the vehicle or cushioning road running impact using the plurality of the air blocks 150 arranged in the circumferential direction of the tire (a function of the pneumatic tire).

In addition, when one of the plurality of air blocks 150 arranged in the circumferential direction of the tire is damaged, after removing the damaged air block 150 from the air block mounting space 140, it can be easily replaced with a new air block 150 prepared in advance in the vehicle interior (for example, a trunk room, etc.), and so the present disclosure can not only improve reliability associated with tire replacement, but also provide an advantage of not requiring air filling as with the airless tire.

In addition, in the present disclosure, since the air blocks 150 may be inserted and mounted into the plurality of air block mounting spaces 140 arranged in the circumferential direction of the tire, respectively, to support a weight of the vehicle or to easily cushion road running impact, it is possible to provide excellent ride comfort and high speed running stability as with pneumatic tires.

On the other hand, it is preferable to lock the air block 150 when the air block 150 is inserted and mounted into the air block mounting space 140, to prevent the air block from being detached from the air block mounting space 140.

To this end, a locking structure for preventing a detachment of the air block 150 may be integrally formed with or detachably mounted on the air block mounting space 140.

Figure 7A:
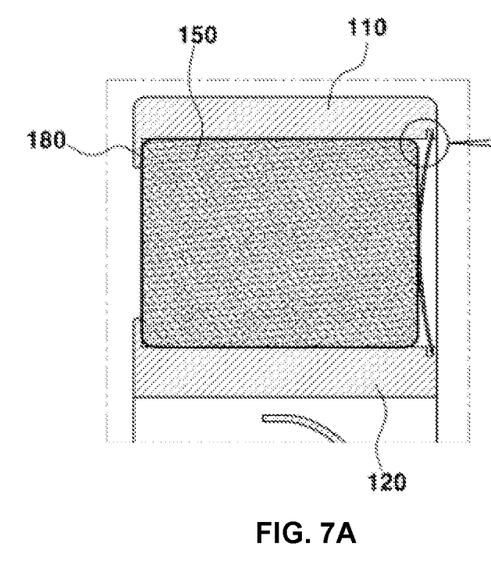
FIG. 7A is a cross-sectional view illustrating one example of an air block locking structure of the tire for the vehicle, according to the present disclosure.
Figure 7B:
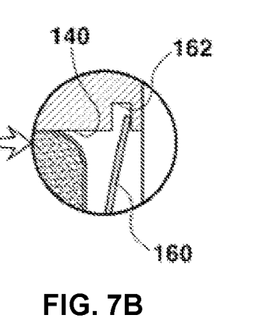
FIG. 7B is an enlarged section of the air block locking structure of FIG. 7A.

As one example of the locking structure, as illustrated in FIGS. 7A-7B, an elastic locking plate 160 may be detachably mounted to an entrance of the air block mounting space 140 so as to lock the air block 150 inserted into the air block mounting space 140.

Preferably, the locking plate 160 is formed to have an elongated rectangular plate structure which can be bent and has an elastic restoring force like a leaf spring.

At this time, at the entrance of the air block mounting space 140, locking recesses 162 into which both end portions of the locking plate 160 are inserted and coupled, respectively, are formed in the tread rim part 110 which forms an upper portion of the above entrance, and in the hub 120 which forms a lower portion of the above entrance, respectively.

In the above structure, after inserting the air block 150 into the air block mounting space 140, the processes of inserting and coupling one end portion of the locking plate 160 into one locking groove 162, making the locking plate 160 bent inward to be in close contact with the air block 150, and inserting and coupling the other end portion of the locking plate 160 into the other locking groove 162 are performed, so that the air block 150 inserted into the air block mounting space 140 may be locked so as not to be detached by the locking plate 160.

Figure 8A:
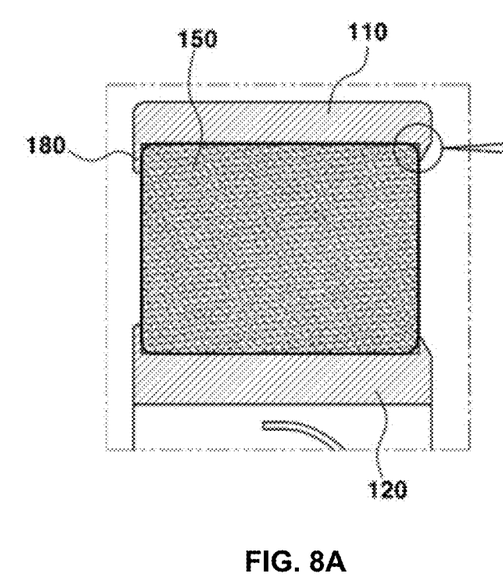
FIG. 8A is a cross-sectional view illustrating another example of the air block locking structure of the tire for the vehicle, according to the present disclosure.
Figure 8B:
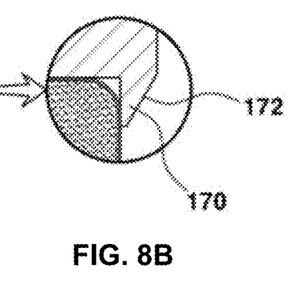
FIG. 8B is an enlarged section of the air block locking structure of FIG. 8A.

As another embodiment of the locking structure, as illustrated in FIGS. 8A-8B, a locking rim portion 170 for locking the air block 150 inserted into the air block mounting space 140 is formed on an inner circumferential surface of the entrance of the air block mounting space 140 to protrude in a radial direction of the tire.

At this time, a guide surface 172 is formed on an outer surface of the locking rim portion 170, and this guide surface is inclined downward from an outside to an inside to easily insert and guide the air block into the air block mounting space 140.

Therefore, when the air block 150 is inserted into the air block mounting space 140, the air block 150 may be easily inserted into the air block mounting space 140 while being compressed along the guide surface 172. In addition, after insertion, the air block 150 is in a state in which an outer surface portion thereof is locked by the locking rim portion 170, so that it is possible to easily prevent the air block 150 inserted into the air block mounting space 140 from being detached.

On the other hand, a structure that prevents a detachment of the air block 150 is formed on an opposite opening of the air block mounting space 140, that is, on an opening opposite to the entrance through which the air block 150 is inserted.

Preferably, stopper steps 180 for preventing a detachment of the air block 150 are formed on a portion of the tread rim part 110 which forms an upper portion of the above opposite opening of the air block mounting space 140, and on a portion of the hub 120 which forms to a lower portion of the above opening, respectively. Here, each stopper step is integrally formed on the tread rim part/the hub and protrudes in the radial direction of the tire.

As described above, even though one of the plurality of air blocks 150 arranged in the circumferential direction of the tire is damaged, the tire according to the present disclosure may provide simultaneously a function of capable of running the vehicle using a supporting force of the spokes 130 (a function of the airless tire) and a function of supporting a weight of the vehicle or cushioning road running impact using the plurality of the air blocks 150 arranged in the circumferential direction of the tire (a function of the pneumatic tire).

In addition, when one of the plurality of air blocks 150 is damaged, after releasing a locking state and then removing the damaged air block 150 from the air block mounting space 140, anyone can easily replace it with a new air block 150 prepared in advance in the vehicle interior (for example, a trunk room, etc.), and therefore, the present disclosure not only can improve reliability associated with tire replacement, but also provide an advantage of not requiring air filling as with the airless tire.

The present disclosure has been described in detail with reference to preferred embodiments thereof. However, it will be appreciated by those skilled in the art that changes may be made in these embodiments without departing from the principles and spirit of the present disclosure, the scope of which is defined in the appended claims and their equivalents.

What is claimed is:

1. A tire for a vehicle, the tire comprising;
    a tread rim part configured to come into contact with a road surface;
    a hub to be mounted to a wheel;
    a plurality of spokes connected to and arranged between the tread rim part and the hub in a circumferential direction;
    an air block mounting space formed between the spokes to be arranged in the circumferential direction; and
    an air block which is detachably inserted and mounted into the air block mounting space,
    wherein the air block mounting space comprises a locking structure configured to prevent the air block from being detached,
    wherein the locking structure is an elastic locking plate, and the elastic locking plate is detachably mounted on an entrance of the air block mounting space to lock the air block inserted into the air block mounting space,
    wherein at the entrance of the air block mounting space, the tread rim part and the hub have locking grooves formed therein, and both end portions of the locking plate are inserted and coupled into the locking grooves, respectively, and
    wherein the locking plate is configured to have an elongated rectangular plate structure which can be bent and has an elastic restoring force.

2. The tire of claim 1, wherein the spokes and the air block mounting space are alternately arranged in the circumferential direction.

3. The tire of claim 1, wherein the air block has a size filling an internal volume of the air block mounting space.

4. The tire of claim 1, wherein stopper steps for preventing a detachment of the air block are further formed on a portion of the tread rim part which forms an upper portion of an opposite opening of the air block mounting space, and on a portion of the hub which forms a lower portion of the opening, respectively, and the stopper steps are integrally formed with the tread rim part and the hub, respectively.

* * * * *